W. M. PAGE.
GRADUAL REDUCTION MILL.
APPLICATION FILED JUNE 19, 1908.

977,542.

Patented Dec. 6, 1910.
10 SHEETS—SHEET 2.

Fig. 2.

WITNESSES:

INVENTOR
WILLIAM M. PAGE

W. M. PAGE.
GRADUAL REDUCTION MILL.
APPLICATION FILED JUNE 19, 1908.

977,542.

Patented Dec. 6, 1910.
10 SHEETS—SHEET 4.

Fig. 4.

WITNESSES:
John R. Marsh
Lewis N. DeVore

INVENTOR
William M. Page
By Thomas L. Ryan
ATTORNEY.

W. M. PAGE.
GRADUAL REDUCTION MILL.
APPLICATION FILED JUNE 19, 1908.

977,542.

Patented Dec. 6, 1910.
10 SHEETS—SHEET 6.

*Fig. 6.*

WITNESSES:

INVENTOR
WILLIAM M. PAGE
BY
ATTORNEY

W. M. PAGE.
GRADUAL REDUCTION MILL.
APPLICATION FILED JUNE 19, 1908.

977,542.

Patented Dec. 6, 1910.
10 SHEETS—SHEET 7.

Fig. 7.

WITNESSES:

INVENTOR
WILLIAM M. PAGE
BY
ATTORNEY

W. M. PAGE.
GRADUAL REDUCTION MILL.
APPLICATION FILED JUNE 19, 1908.

977,542.

Patented Dec. 6, 1910.
10 SHEETS—SHEET 8.

INVENTOR
WILLIAM M. PAGE
BY
Thomas L. Ryan
ATTORNEY

W. M. PAGE.
GRADUAL REDUCTION MILL.
APPLICATION FILED JUNE 19, 1908.

977,542.

Patented Dec. 6, 1910.
10 SHEETS—SHEET 9.

WITNESSES:
John R. Marsh
Lewis N. DeVore

INVENTOR
WILLIAM M. PAGE.
By Thomas L. Ryan
ATTORNEY.

W. M. PAGE.
GRADUAL REDUCTION MILL.
APPLICATION FILED JUNE 19, 1908.

977,542.

Patented Dec. 6, 1910.
10 SHEETS—SHEET 10.

WITNESSES:
John R. Marsh
Lewis N. DeVore

INVENTOR
WILLIAM M. PAGE
BY Thomas L. Ryan
ATTORNEY

UNITED STATES PATENT OFFICE.

WILLIAM M. PAGE, OF MONTPELIER, INDIANA, ASSIGNOR TO MONTPELIER CUP AND METAL WORKS, OF MONTPELIER, INDIANA, A CORPORATION.

GRADUAL-REDUCTION MILL.

977,542.     Specification of Letters Patent.     Patented Dec. 6, 1910.

Application filed June 19, 1908. Serial No. 439,404.

*To all whom it may concern:*

Be it known that I, WILLIAM M. PAGE, a citizen of the United States, and a resident of Montpelier, in the county of Blackford and State of Indiana, have invented new and useful Improvements in Gradual-Reduction Mills, of which the following is a specification.

Purposes of this invention are to provide a mill of the kind referred to which will be of rigid and durable structure, economical and reliable of operation and in which vibration is reduced to a minimum, and which will be easy of manipulation. These and other objects which will become apparent as the features of my invention are disclosed are accomplished by the construction, combination and arrangement of parts set forth in this specification, pointed out in the claims, and illustrated in the drawings forming a part hereof, wherein similar characters of reference refer to corresponding parts throughout the several views.

Fig. 11 is a view of the block-bolt removed. Fig. 17 is a plan view.

Arranged as shown on the floor A, are the three pairs of posts 1, the pair of posts 2, and the pair of posts 3. All of these posts are provided with the flanges 4, and the posts 2 and 3 are extended in height and adapted to receive connections for the superstructure to be presently described. Supported on these posts and secured thereto by being bolted to the flanges 4 are the oppositely disposed frame members 5. For these frame members I have used the Z bar structural shape as shown; each has its upper flange properly recessed to accommodate the upwardly extended portion of the posts 2 and 3, as shown.

Figure 9:
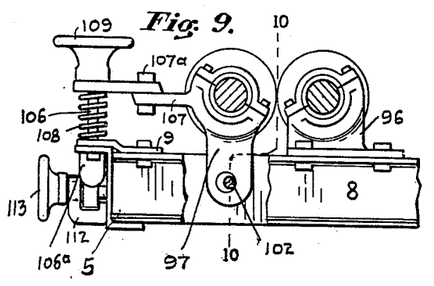
Fig. 9 is a detached enlarged view of the roll adjusting device.

Extending transversely are the end girders 6 and 7 and the intermediate girders 8, each composed of a pair of channels sustained a proper distance apart having their bottom flanges bolted to the lower leg of the Z bar and their upper flanges bolted to the flange plates 9, as plainly shown in Fig. 9.

Disposed between the channels of each girder is the separator 9ª having the suitable aperture 9ᵇ through which passes the shaft 10 that extends the entire length of the frame and is journaled at each girder in the pillow block 11. The bolts 12 hold the pillow block, channels and separator firmly in correct position.

Secured on the end of the shaft 10 is the pulley 13 and on the other end is secured the crank-wheel 14 the functions of which pulley and crank-wheel will be presently set forth.

15 designates supports that are secured to the posts 2 and 3 and upon which supports the upper girders 16 are connected and sustained.

Journaled in pillow blocks provided therefor on the upper girders are the break rolls 17 17 and 18 18 and journaled in like manner on the end girders 6 and 7 and the intermediate girders are the pairs of rolls 19 19, 20 20, 21 21, 22 22, 23 23, 24 24, 25 25, 26 26. The end of the shafts of the inner roll of each of these pairs of rolls are connected by a suitable coupling 27 whereby any one roll or pair of rolls may be removed. Each outer roll of these pairs of rolls is geared to the inner roll by the gear wheels 28 and 29, and the extended shaft 30 of the inner roll 25 and the shaft 30$^a$ of the inner roll 26 have the pulleys 31 and 32 secured thereon respectively. The belt 32$^a$ transmits the driving power to the mill over the pulleys 32 and 32$^b$ the latter being journaled in the suitable support 32$^c$ that is secured to the frame.

Secured on the extended shaft 33 of the inner roll 19 and that of the inner roll 20, are the pulleys 34 and 35 respectively. 36 and 37 designate similar pulleys secured on the extended shaft of the inner break-roll 17 and that of the inner break-roll 18 respectively. Each outer roll 17, 18, 19 and 20 is geared to the inner roll by the gear wheels 38 and 39. The motion of the pulleys 34 and 35 is transmitted by the suitable belting 40 to the pulleys 36 and 37.

Figure 1:
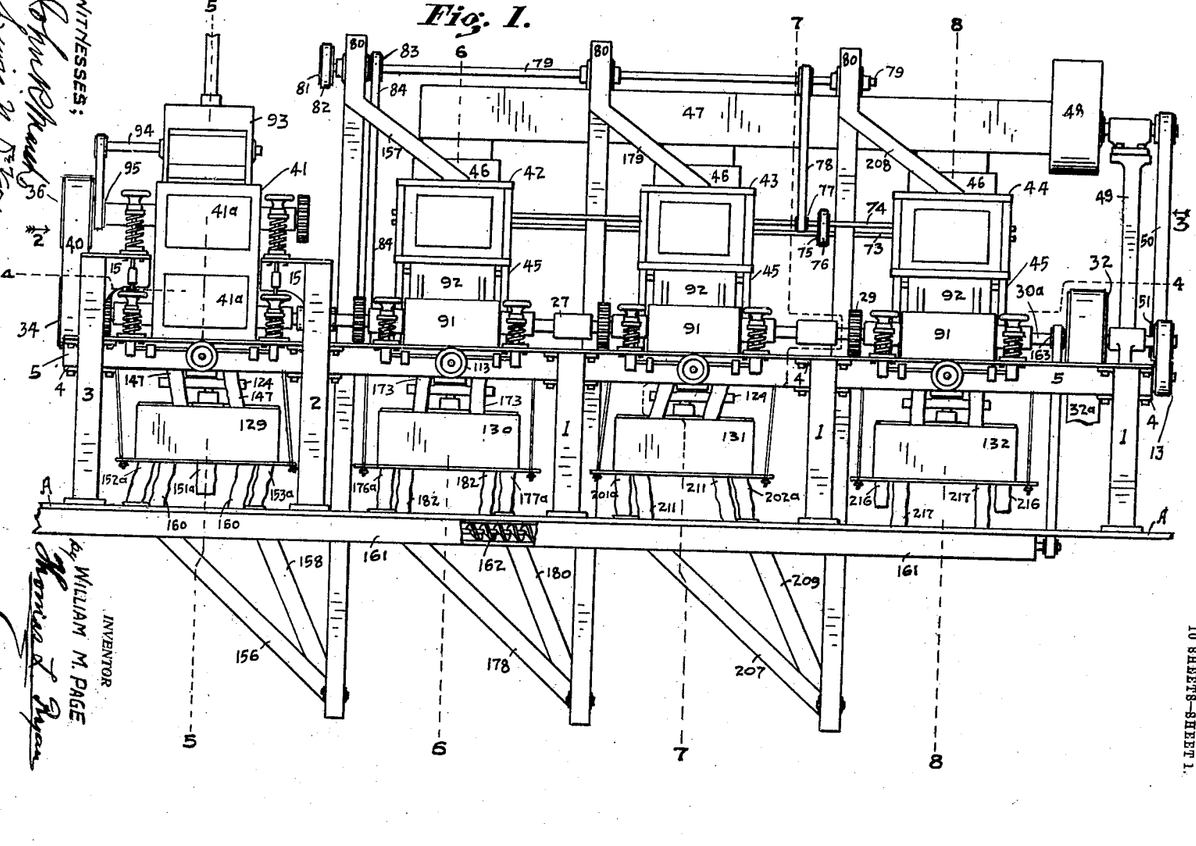
Figure 1 is a front view of my improved gradual reduction mill.
Figure 5:
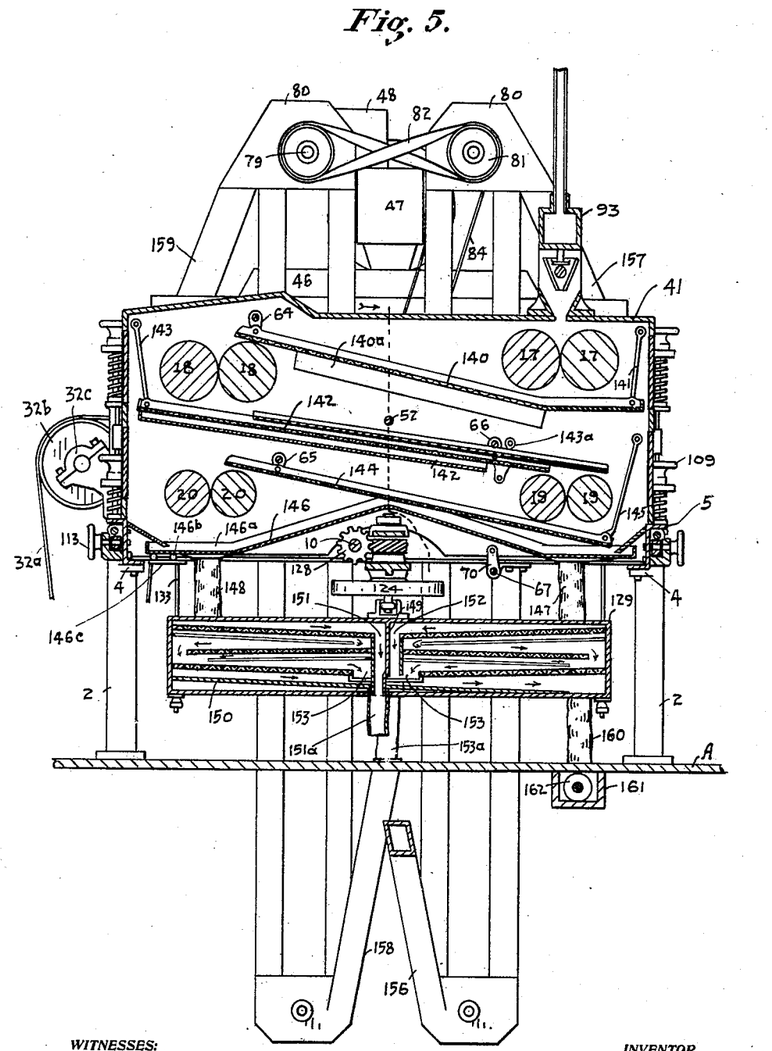
Fig. 5 is a vertical transverse sectional view taken on the line 5—5 Fig. 1.

The mill casement 41 provided with the end doors 41$^a$ and the side doors 41$^b$ rests upon the Z bars as shown in Fig. 1 and Fig. 5. These doors and side doors permit of the usual easy access at all times to the interior of the mill casement.

The purifier casements 42, 43 and 44 are bottomless and are supported by the substantial standards 45 that are bolted securely to the intermediate girders 8.

46 designates an air-chamber superincumbent and having connection with each of the said purifier casements through suitable valve openings 46$^a$ covered by the valves 46$^b$; these valves are provided with the exteriorly disposed handles and suitable adjustments 46$^c$ whereby the valves may be manipulated for the flow of more or less air through said openings and may be sustained in adjusted positions. The air-chambers 46, each communicate with the air-conduit 47 which at its end is provided with an ordinary rotary-fan disposed in the housing 48 and which fan is suitably mounted on the truss 49 supported on the end-girder 6. This rotary-fan is driven by the belt 50 that runs over the pulley 51 carried by the shaft 30.

Journaled in the upper girders 16 is the shaft 52 provided with the crank 53. The free end of this crank is suitably slotted whereby the wrist-pin 55 that is adjustably secured therein and which is journaled in the connecting-rod 56, may be set and retained in different positions. The lower head of the said connecting rod is journaled on the wrist pin of the crank-wheel 14, the radius of which crank-wheel, with reference to that of the crank 53 is such, that with the rotation of the said crank-wheel a proper reciprocatory movement of the crank 53 will be obtained. Secured on the shaft 52 near the wall of the mill-casement is a face-wheel 57 which carries suitable wrist-pins upon which are journaled the heads of the connecting-rods 58, 59 and 60 that engage the cranks 61 and 62 and the bell-crank 63 respectively. These cranks and bell-crank are each secured to a separate transversely disposed shaft that is suitably journaled in the walls of the mill casement. Secured to these shafts are the cranks 64 65 and 66 respectively as shown in Fig. 5, the functions of which will presently be described.

Journaled in pillow-blocks that are secured on the bottom of the end girder 7 and intermediate girder 8, is a shaft 67 that has the crank 68 secured on its end and which crank is actuated by the connecting-rod 69 that engages the bell-crank 63.

Figure 23:
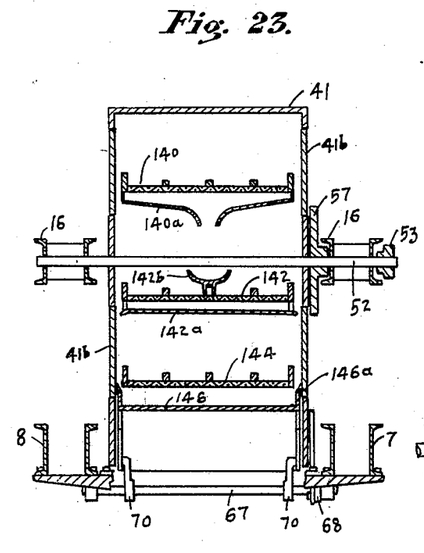
Fig. 23 is a transverse sectional view taken on the dotted line and in the direction indicated by the arrow 23 in Fig. 5.
Figure 24:
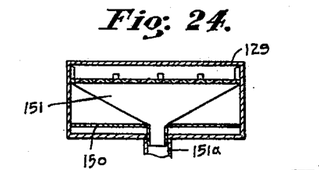
Fig. 24, Figs. 25 and 26, are transverse sectional views of the central portion of the sifter casement 129.
Figure 25:
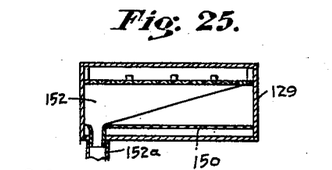
Figure 26:
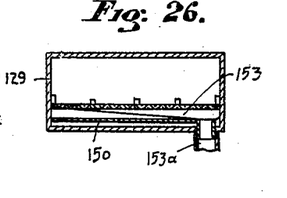

70 designates cranks that are secured to the shaft 67, as shown in Fig. 5, and Fig. 23.

Figure 20:
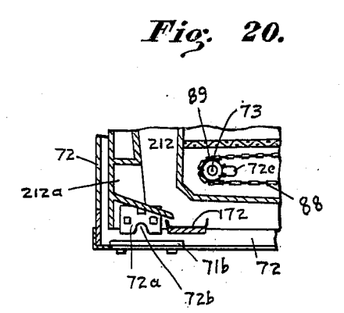
Fig. 20 is an enlarged detached view of the roller bearing for the frames 72.

Supported so as to move reciprocatingly in the purifier casements 42 43 and 44 are the frames 72 in each of which are carried a sieve and other parts that are to be presently referred to. To accomplish the carriage of these frames in a manner whereby the tendency to vibration is overcome, and at the same time to provide such construction therefor that will be economical of manufacture, reliable in operation and which will be easy to assemble, I have devised the details of construction shown in Fig. 20 and Fig. 21. Secured by countersunk bolts to the walls of the frame 72 are the bearing-plates 72$^a$ provided with the semicircular bearings 72$^b$. Loosely journaled on the shaft 71$^a$ are the flanged wheels 71, adapted to rest on the track-plate 71$^b$ that is suitably secured to the interior face of the bottom edge of the purifier casement.

Figure 21:
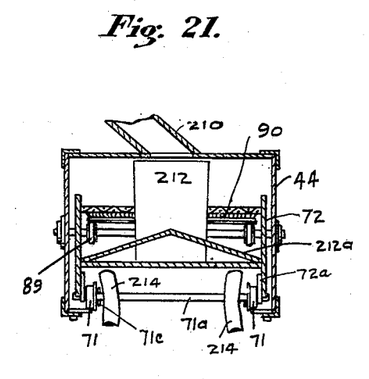
Fig. 21 is a transverse sectional view taken on the line 21—21, and in the direction indicated by the arrow 21 Fig. 8.

71$^c$ designates cotter-pins that are passed through the shaft 71$^a$ at such location that the flanged wheels 71 will be sustained in the position as shown in Fig. 21. By this construction all of the parts may be easily assembled, and when so assembled the entire structure will retain its correct position.

Longitudinal slots 72$^c$ of proper length and location are provided in the sides of the frames 72 through which slots pass the shafts 73 and 74 that are journaled in the walls of the purifier casements; the pulleys 75 of these shafts are belted together by the belt 76. The pulley 77 carried by the shaft 74 is connected by the belt 78 to one of the shafts 79 that are journaled in the elevator heads 80 and which have the pulleys 81 over which runs the crossed belt 82. A pulley 83 secured on one of the shafts 79 is connected by the belt 84 to the pulley 85 carried by the shaft 10.

Figure 22:
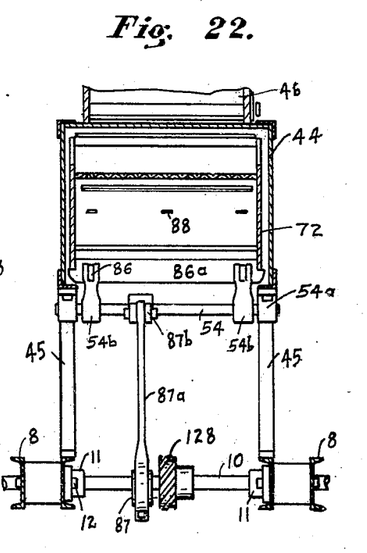
Fig. 22 is a transverse sectional view taken on the line 22—22, and in the direction indicated by the arrow 22 in Fig. 8.

Journaled in the pillow-blocks 54ª underneath each of the purifier casements is a shaft 54. Keyed to this shaft near its ends are the cranks 54ᵇ, to the free end of each of said cranks is pivotally connected the reach-rod 86. The threaded end of this reach-rod is secured by suitable set nuts, to the cross-strut 86ª which is carried by the frame 72, as plainly shown in Fig. 8 and Fig. 22. Carried by the shaft 10 at a proper location underneath each of the purifier casements is an eccentric 87, the rod 87ª of which is pivotally connected to the crank 87ᵇ. The said eccentric is held by a suitable set-screw in adjustable position on the shaft 54. By this arrangement a positive and direct drive and adjustment of the relative position of each of the frames 72 is obtained the utility of which arrangement will presently become apparent.

Between the sides of each frame 72 runs a series of endless chain-belts 88 over the sprocket-wheels 89 that are secured on the shaft 73 and the shaft 74. Carried by these chain-belts is the well known brush 90, the function of which is to rake the bottom of the sieve under which it passes.

At each pair of rolls is provided the suitable housing 91 having its lower walls disposed at such angularity as to form a hopper underneath the rolls. The top of each housing is removably arranged as shown, and is provided with a properly disposed transverse opening 91ª above which the removable hopper-boxes 92 reside. Each of these housings is so constructed that its frontal side rests upon the Z bar and its rear side rests upon the top flanges of the girders, as plainly shown in Fig. 6, whereby a structure which is substantial, compact and efficient, and which permits of exceedingly easy access to the rolls and adjacent parts is obtained.

Figure 2:
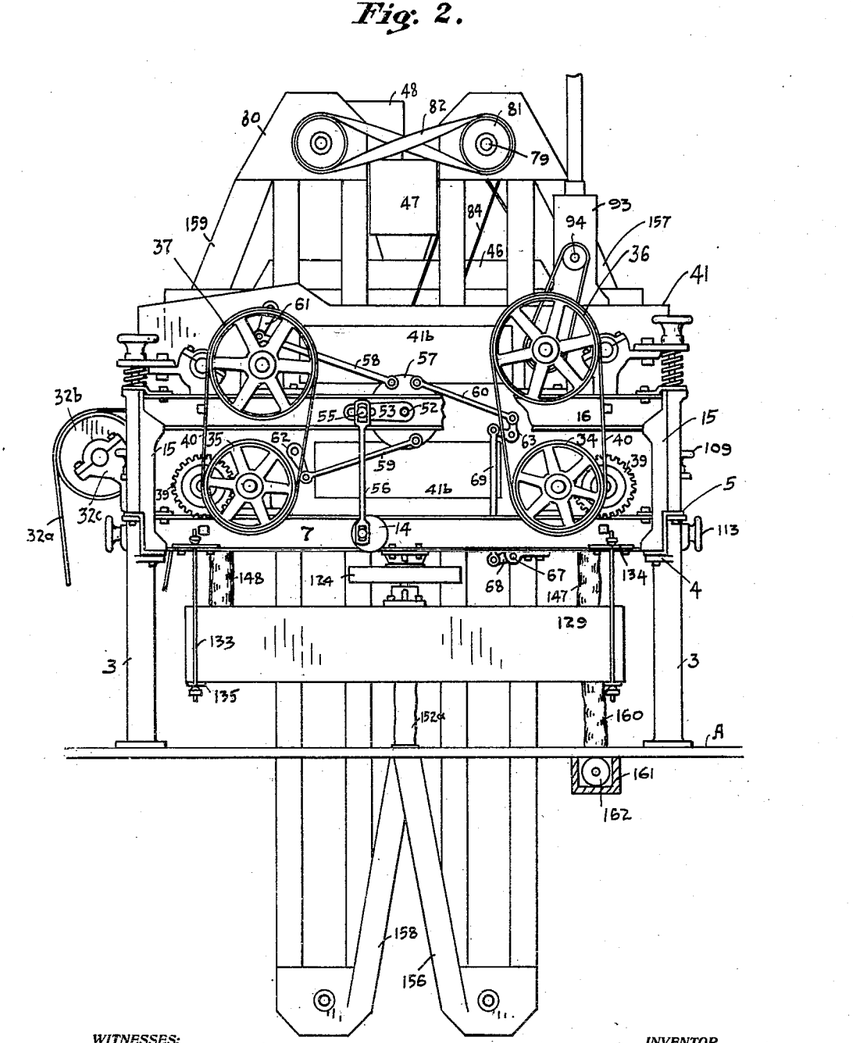
Fig. 2 is an end view taken in the direction indicated by the arrow 2 in Fig. 1, a portion of the upper girder 16 being broken away.
Figure 3:
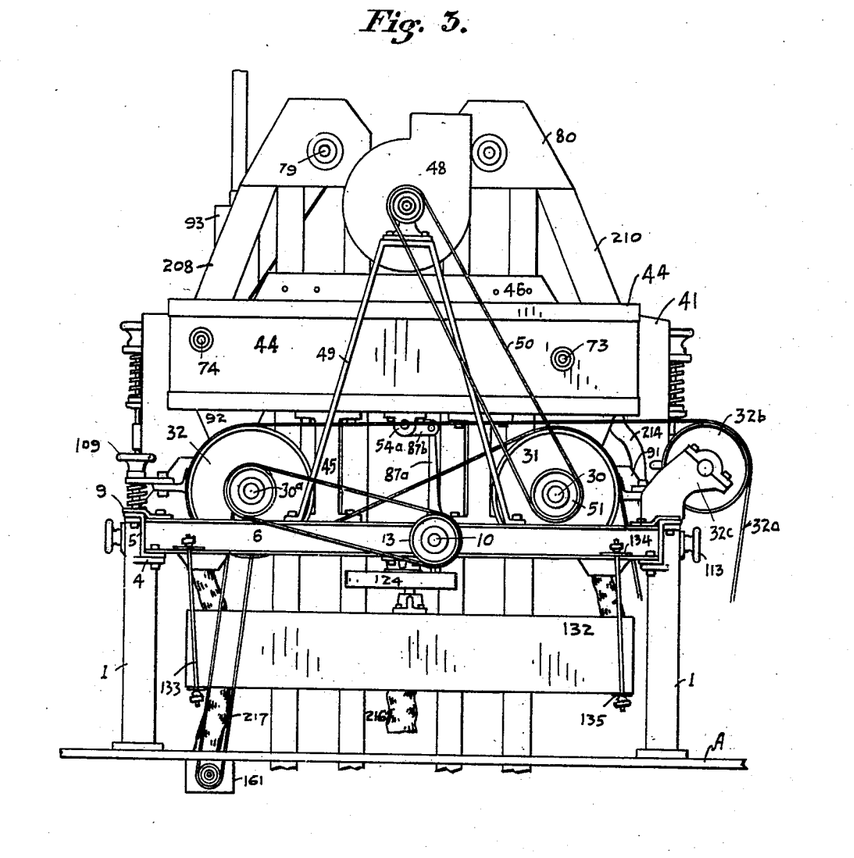
Fig. 3 is an end view taken in the direction indicated by the arrow 3 in Fig. 1, the lower portions of the elevator legs being broken away.
Figure 4:
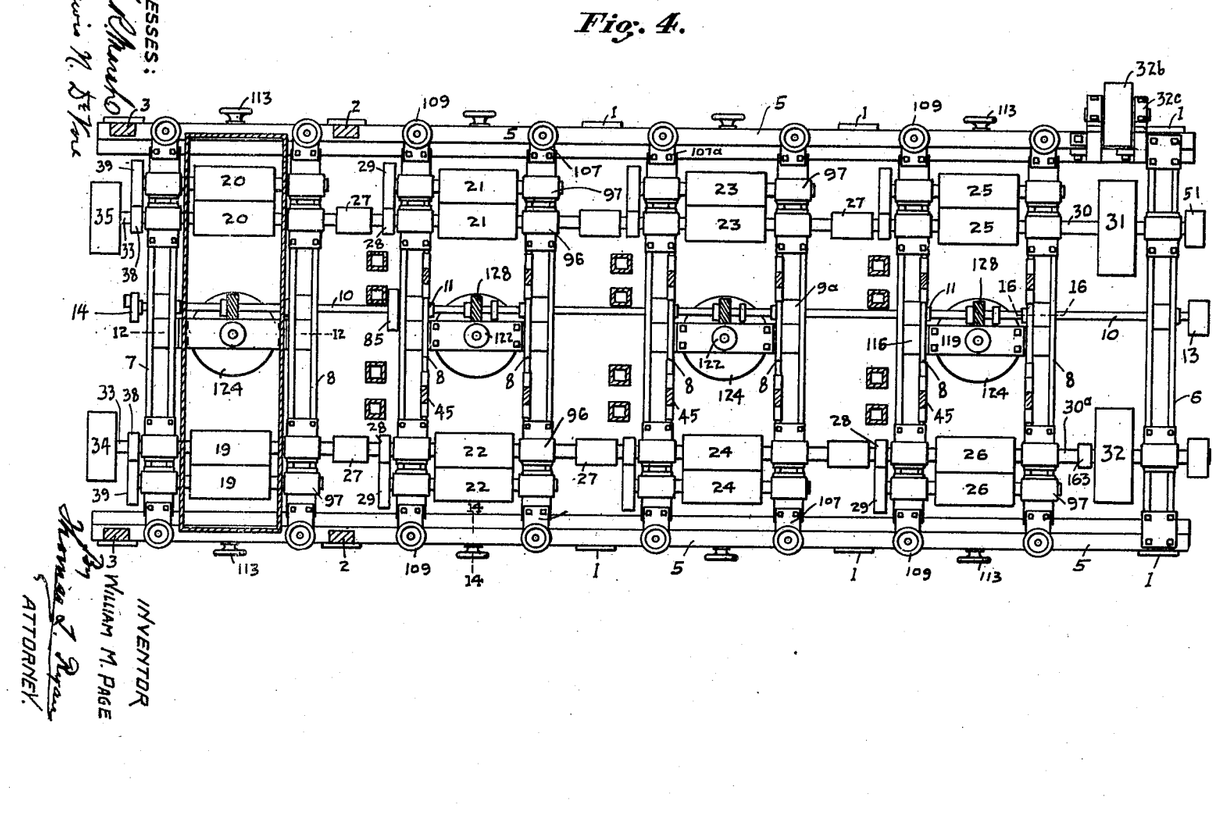
Fig. 4 is a plan view taken on the line 4—4 Fig. 1, the housings and mill casement having been removed, and the belting being not shown.

Mounted upon the mill casement at a proper location above the break-rolls 17 17 is the feeder-box 93 of the usual function and structure and so arranged that the wheat from the heater (not shown) will feed down to the said break rolls in a stream of uniform bulk throughout the width of the feeder-box. A suitable pulley carried by the shaft 94 of the agitator of this feeder-box is belted to the pulley 95 carried by the shaft of one of the break-rolls 17, as shown in Fig. 1 and in Fig. 2.

Figure 10:
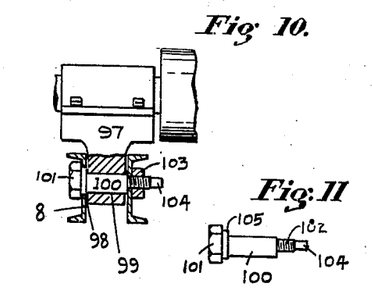
Fig. 10 is a transverse sectional view taken on the line 10—10 Fig. 9.

In the operation of mills of this character it is very essential that nice adjustment of one roll to the other, of each pair of rolls may be obtained, and that the rolls may be then sustained in such adjustment. To this end I have devised the construction, combination and arrangement of parts now to be described. The inner roll of each pair is journaled in the pillow block 96 of usual structure which is bolted securely to the girder. The outer roll is journaled in a pillow block 97 of the design as shown plainly in Fig. 9 and Fig. 10. This pillow-block 97 has a base of such width as to provide suitable clearance 98 between the sides of the girder, and has the transverse bore 99 of such diameter as to retain snugly the block-pin 100. This block-pin 100 is of the peculiar design as plainly shown in Fig. 10 and Fig. 11, and has a suitable head 101; the shank 102 that is threaded to receive the nut 103 has the head 104 to which head a wrench may be applied; the shoulder 105 is machined to fit the hole that is provided for it in the side wall of the girder; a hole is provided in the opposite wall of the girder to retain in like manner the shank 102. The center line of this block-pin is eccentric to the center line of the shoulder 105 and the shank 102 so that when in position as shown in Fig. 9, in the fixed bearings in the girder, a rotary movement of the block-pin by application of a wrench or crank to the head 104 will cause the slight raising or lowering of the pillow block and the end of the roll that is journaled therein. When this pillow-block has been raised or lowered to the exact vertical position desired then the nut 103 is screwed down tight against the wall of the girder and the block-pin will be held immovably. Great strain imposed upon the roll will not move the block-pin after it has been so tightened in position.

Disposed in rigid position at a point adjacent to the pillow block 97 is the upright 106 having its upper portion threaded. An arm 107 that is formed integral with this pillow-block has a suitable aperture through which the upright 106 is passed and underneath this arm and about the upright is the strong coil-spring 108 which will press the roll against the fixed roll. The hand-wheel 109 has its hub threaded to fit the upright 106 and when screwed down thereon will depress the arm and thereby draw the pillow-block away from the fixed roll. By this arrangement the horizontal distance between the rolls may be adjusted to a nicety, the normal operation of the rolls will be effective as usual, and in case a hard foreign substance should pass between the rolls there will be sufficient yield of the coil-spring 108 to prevent the derangement of any of the parts or the mutilation of the face of the roll. The arm 107 is separable, as shown in the drawings at Fig. 9; the two parts have their meeting faces machined so as to fit each other accurately and are fastened together by a pair of bolts 107ª. By this construction and arrangement the placement of the parts in assembling the mill is facilitated and a further advantage is that the outer roll and also the pillow blocks 97 may be easily manipulated or taken down, or entirely removed.

Figure 14:
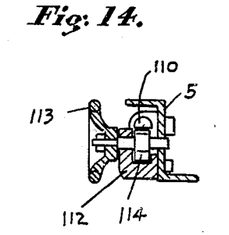
Fig. 14 is an enlarged transverse sectional view on the line 14—14 Fig. 4.
Figure 15:
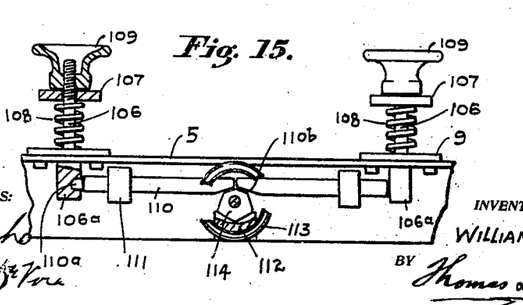
Fig. 15 is an enlarged front view of the roll manipulating device, a portion of the hand wheel 113 being broken away.
Figure 16:
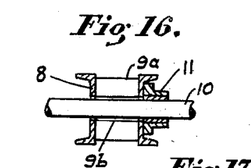
Fig. 16 is an enlarged transverse sectional view taken on the line 16—16 Fig. 4.
Figure 17:
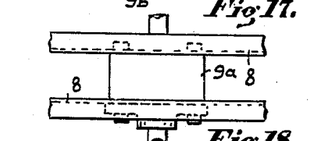
Figure 18:
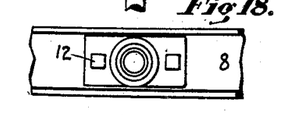
Fig. 18 is a side view of a portion of the girder shown in Fig. 16.

The bottom end of each of the uprights 106 is provided with the head 106ª suitably bored to receive the shouldered ends 110ª of the divided shaft 110. The opposite portions of this shaft are secured in the fulcrum-blocks 111, secured to the Z bar, as shown in Fig. 14, so that they are free to oscillate when the shaft 110 is moved in a vertical plane. Disposed centrally between the fulcrum-blocks and at the meeting ends of this divided shaft, is the block 112 secured to the Z bar in which block is journaled a shaft that has the hand-wheel 113 and the cam 114. This cam will engage the machined faces 110ᵇ.

The advantage obtained by this construction and arrangement is that the outer roll may be drawn away from its operative position, without the necessity in each instance of manipulating the hand-wheels 109. This is a very desirable result to obtain, as the rolls when in operative engagement, and no flour or stock may be passing between them, will frequently grind and cut. To quickly obviate such occurrence the hand wheel 113 is rotated whereby the cam 114 will raise the meeting ends of the divided shaft 110, thus slightly lowering the uprights 106 and drawing the outer roll away from its actual engagement with the fixed roll.

Figure 12:
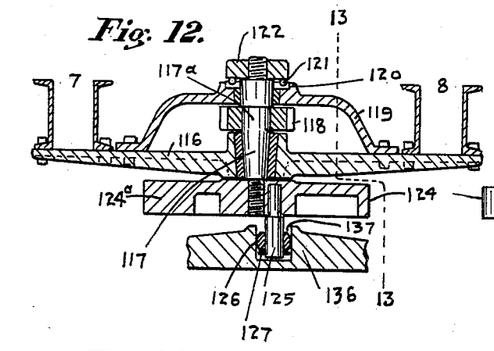
Fig. 12 is a transverse sectional view taken on the line 12—12 Fig. 4.
Figure 13:
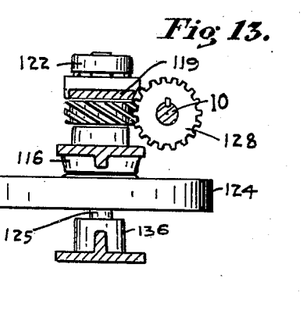
Fig. 13 is a transverse sectional view taken on the line 13—13 Fig. 12.

Extending centrally and longitudinally of the mill and bolted to the bottom flanges of each pair of girders, are the struts 116 each of which supports a suitable boxing for the lower portion of the king shaft 117 upon which is keyed the spiral gear wheel 118 at the shoulder portion 117ª thereof as shown in Fig. 12. The upper portion of this kingshaft is journaled in suitable boxing supported by the standard 119 that is bolted to the struts 116, and in which said standard a suitable recess 120 is provided wherein a ball race that carries the balls 121 is fitted in the usual way.

Screwed down on the threaded shank of the king-shaft is the head 122 provided with a suitably machined track 123 on its underside to rest on the balls 121. The thread of said shank is right or left handed according to the direction of rotation of the king shaft. The bottom of the king shaft has a similar threaded shaft of smaller diameter upon which is screwed the drive-wheel 124. This drive wheel is of ample size and weight and in its hub is secured, a suitable distance from the center, the shouldered wrist-pin
125. This wrist-pin is preferably secured by having the drive wheel shrunk thereon and its lower portion is provided with the loosely disposed convex-faced ring 126 sustained in position by the cotter-pin 127.
Located at proper positions and secured on the shaft 10 and adapted to mesh with the spiral gear wheels 118, are similar spiral gear wheels 128.

Underneath the drive-wheels 124 are centrally disposed the sifter casements 129, 130, 131 and 132 in which are retained the sieves and conveyers to be presently referred to. Each of these sifter casements is suspended by four suspension rods 133 loosely disposed in the bars 135 secured thereon, and which suspension rods have their upper ends held loosely in the lugs 134 secured on the girders. On the top of each sifter casement is secured a housing 136 having the machined cylindrical recess 137. These sifter-casements are suspended at such height that the rings 126 will occupy the position in the recess 137 as plainly shown in Fig. 12. In assembling the mill the drive wheels are geared with reference to the shaft 10 as shown in Fig. 1. The wrist pins marking the four quarters of a circle. The counter balance 124ª of the drive wheels is provided to add steadiness to the movement of the drive-wheel. By this construction, combination and arrangement a positive gyratory drive which is substantially free from vibration and which is certain in operation, is afforded for the said sifter-casements.
In the mill casement 41 the sieve 140 has its lower end suspended on the hangers 141 and has the divided bottom 140ª as shown in Fig. 5 and Fig. 23, the upper end of this sieve is pivotally supported on the crank 64.
The sieve 142 has its upper end suspended on the hangers 143 and its lower end supported on the hangers 143ª, and has the solid bottom 142ª; this sieve is actuated by the cranks 66. Carried by this sieve 142 is the U shaped conveyer trough 142ᵇ, as plainly shown in Fig. 23.

144 designates a third sieve, its lower end being suspended by the hangers 145 and its upper end being supported on the cranks 65.
These sieves are of the usual construction being provided with longitudinal partitions and are of width substantially equal to the inside width of the mill casement, there being sufficient clearance for them to work freely therein. Underneath the sieve 144 is disposed the shoe 146 having the raised edges 146ª and at its ends being provided with the stub-pockets 147 and 148 that extend through the top of the sifter casement
129. This shoe has its free end resting on the rollers 146ª that rest on the supports 146ᶜ bolted to the Z bar, and is reciprocated by the crank 70.

At the sides of the partition 149 which is stopped short of the conveyer 150 and which conveyer extends from end to end of this sifter casement 129, are the passages 151 and 152. The bottom of each of these passages inclines downwardly and terminates with stub end built through the said conveyer 150, the former at the center, and the latter at one side of the sifter-casement. The passage 151 leads into the stub-pockets 151ª; the passage 152 leads into the stub-pocket 152ª. A similar passage 153 which has its bottom inclined downwardly and terminated with its stub end built through the said conveyer 150, leads into the stub-pocket 153ª. The stub-pocket 151ª empties into a suitable discharge conduit (not shown). The stub-pocket 152ª communicates with the spout 156 which leads to the boot of the elevator, the head 80 of which has the feed-spout 157 that leads into the purifier casement 42. The stub-pocket 153ª communicates with the spout 158 that leads in like manner to the feed-spout 159 and into the purifier casement 42. The arrangement of the sieves in the purifier casement 42 and sifter casement 130 is as shown in Fig. 6.

Mounted in the frame 72 and sloping downwardly is the sieve 165; at the lower end of this sieve is the sleeve 166 that forms a boxed-in upper opening for the conveyer 167, which slopes downwardly to the opposite end of the frame.

Figure 19:
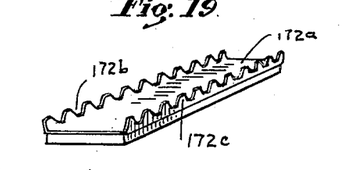
Fig. 19 is a perspective view of the distributer plate removed.

169 designates a reception-plate that is disposed transversely in the frame and is set at such angle that the stock deposited thereon will pass on to the extreme upper end of the sieve 165. Each of the feeder plates 170 and 171 is set at such angle that the contents falling through the sieve 165 and through the sieve 166 and traveling down the conveyer 167 will readily pass down on to the distributers 172. This distributer consists of a body-portion having its sides disposed upwardly and notches provided therein. The preferred form of structure for this distributer is a wooden plate having a cover of smooth sheet metal 172ª its sides being disposed upwardly and provided with a succession of recesses 172ᵇ of such depth that the baffles 172ᶜ are formed as plainly shown in Fig. 19. The function of these distributers is to distribute the stock throughout the width of the rolls that are below, and to cause it to fall to the said rolls in a stream of uniform bulk. From the outlets in the bottom of each of the hoppers under the rolls 22 22 and 21 21 and through the top of the sifter casement 130 extend the stub-pockets 173 and 174.

Figure 6:
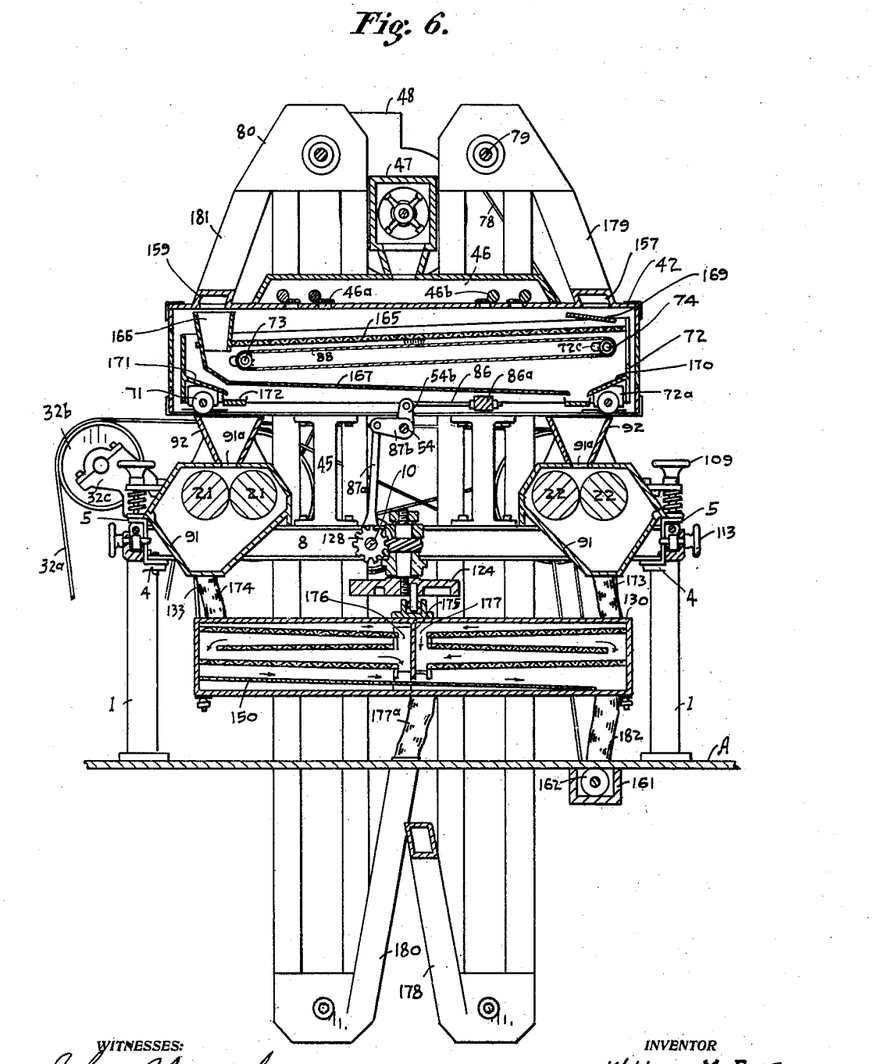
Fig. 6 is a vertical transverse sectional view taken on the line 6—6 Fig. 1.

The arrangement of the sieves and conveyers and for the escapement therefrom of the contents of the sifter casement 130 is shown plainly in Fig. 6. At each side of the partition 175 which is stopped short of the conveyer that extends from end to end of this sifter casement 130, are the passages 176 and 177; the bottom of each of these passages incline downwardly and terminate at opposite sides of the sifter casement with stub-ends built through the said conveyer. The passage 176 leads into the stub-pocket 176ª which communicates with the spout 178 that leads to the boot of the elevator the head 80 of which has the feed spout 179 leading into the purifier casement 43; the passage 177 leads into the stub-pocket 177ª which communicates with the spout 180 that leads in like manner to the feed spout 181 and into the purifier casement 43.

Figure 7:
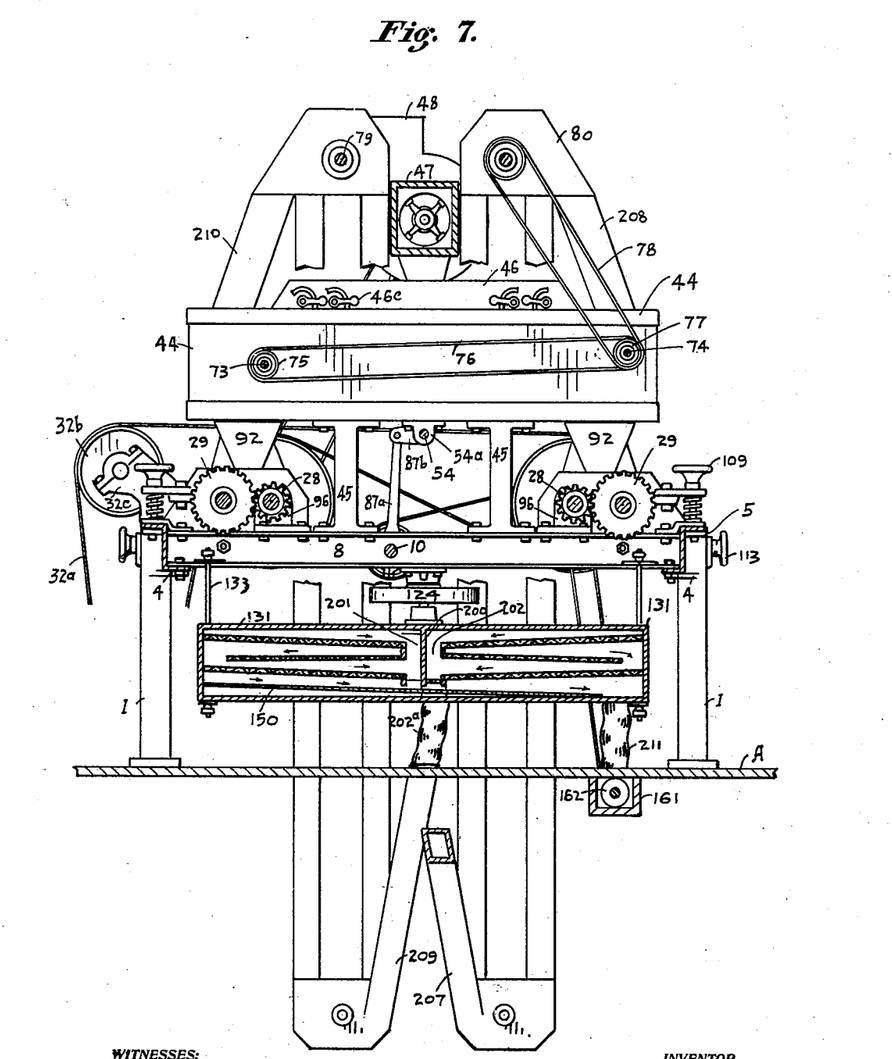
Fig. 7 is a vertical transverse sectional view taken on the line 7—7 Fig. 1, portions of the elevator legs being broken away.

In the purifier casement 43 the arrangement of the sieves and conveyer is the same as in the purifier casement 42. The arrangement of the sieves and conveyers and for the escapement therefrom of the contents of the sifter casement 131 is similar to that of sifter casement 130; reference being now had to Fig. 7 and Fig. 6. At each side of the partition 200 are the passages 201 and 202. The bottoms of each of these passages incline downwardly and terminate at the opposite sides of the sifter casement with stub-ends built through the conveyer 150.

The passage 201 leads into the stub-pocket 201ª which communicates with the spout 207, elevator, and feed spout 208 that leads into the purifier casement 44, the passage 202 leads to the stub-pocket 202ª that communicates with the spout 209 that leads through the feed spout 210 into the purifier casement 44.

Figures 8, 27, 28:
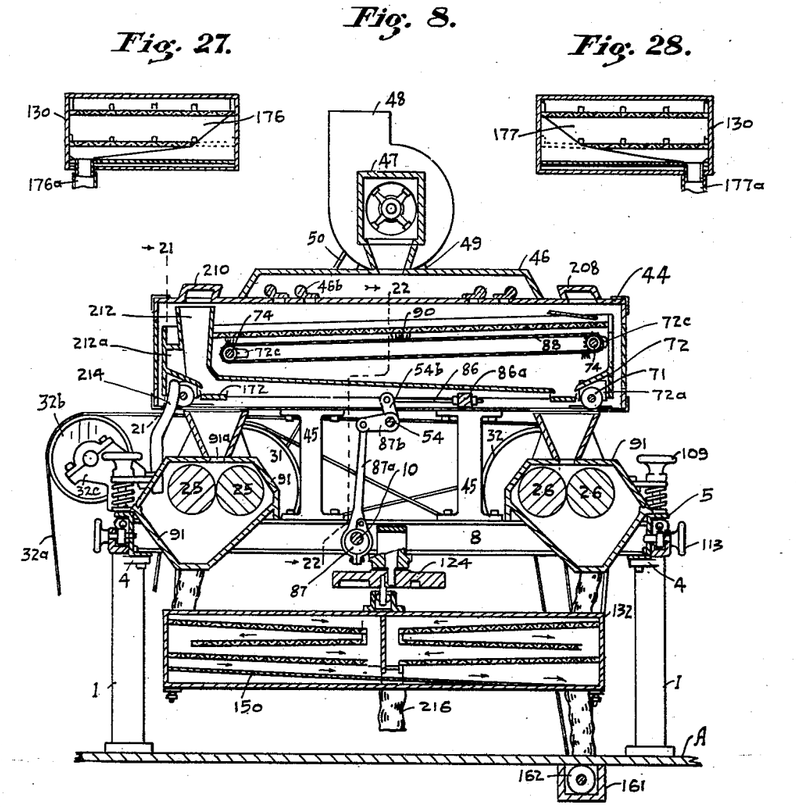
Fig. 8 is a vertical transverse sectional view taken on the line 8—8 Fig. 1, the spiral gear-wheel 128 being removed, and the upper portion of the king-shaft mechanism being broken away.
Fig. 27 and Fig. 28 are similar views of the central portion of the sifter casement 130.

In the purifier casement 44 the arrangement is the same as in the purifier casements hereinbefore described except that the sleeve 212, as shown in Fig. 8, that is boxed up through the sieve, has the downwardly inclined runways 212ª that lead to the stub-pockets 214 which pass into the housing that is below, so that the stock discharged from the said sieve about the said sleeve, will pass down on the runways 212ª through the stub-pocket 214 and housing, and outside the rolls 25 25 and thence directly into the sifter casement 132.

The arrangement of the sieves and conveyers in the sifter casement 132 is the same as that in the sifter casement 131 and as shown in Fig. 8; the tailings are discharged from the sieves and into the passages which are of the structure, and lead in the manner hereinbefore described, to the opposite sides of the sifter casements whence they empty into the stub-pockets 216 that empty into a discharge outlet.

It will be observed that the arrangement for the escapement of the flour is the same throughout all of the sifter casements. In the bottom of each, the conveyer 150 which extends from end to end of the casement is disposed at such angle that the flour that falls from the sieves will be conveyed to the stub-pockets 160, 182, 211 and 217 all of which empty into the flour conduit 161. As a suitable conveying means in this flour conduit I have employed the well known spiral conveyer 162 which is driven by a belt running to the pulley 163 carried by the shaft 30ª.

In placing my improved gradual reduction mill in readiness for operation the sifter casements are so set with reference to each other, and the eccentrics 87 underneath the respective purifier casements are so set with reference to each other, that the casements are actuated in such manner, and the reciprocatory movement of each frame is so alternated with that of the other, that vibratory tendencies are overcome and the entire mill will operate with steadiness and efficiency.

The wheat from the heater is introduced through the feeder box from whence it is fed down between the break roll 17 17 in the usual way. Passing between these break rolls the cracked grain is taken by the sieve 140 which is reciprocated by the crank 64; such portion of the cracked grain as is not sifted through this sieve and passed through the divided bottom 140ª, and conveyed on the reception trough 142ᵇ beyond the rolls 19 19, passes between the break rolls 18 18 and is deposited on the sieve 142 which is reciprocated by the crank 66. Such portion of the cracked grain that is not sifted through this sieve 142 and conveyed over the solid bottom 142ª to the shoe 146, passes between the rolls 19 19 whence it is taken by the sieve 144 reciprocated by the crank 65. Such portion of the stock that is not sifted through this sieve 144 which falls to the shoe 146 is passed between the rolls 20 20 where it also falls to the shoe 146 reciprocated by the crank 70. The stock so disposed on the shoe travels down the angular surfaces thereof through the stub-pockets 147 and 148 and into the sifter casement 129; the bran is scalped off from the upper sieve in the usual way and passes through the passage 151 and the stub-pocket 151ª to a suitable outlet (not shown). The coarse middlings pass through the passage 152, stub-pocket 152ª, spout 156, elevator and feed spout 157 and the finer middlings pass through the stub-pocket 153ª, spout 158 and feed spout 159 to the purifier casement 42. The flour passes through the stub-pockets 160 to the flour-conduit 161.

The coarse middlings that pass from the said spout 157 fall onto the feed plate 169 and are taken by the sieve 165 as shown in Fig. 6. The finer middlings from feed spout 159 pass into the sleeve 166 and there mingle on the conveyer 167 with the stock sifted through the sieve 165. The middlings from the sieve 165 are scalped off at the lower end of the sieve about the sleeve 166 and are delivered over the feeder-plate 171 and distributer 172 to the rolls 21 21; the stock that travels down the conveyer is delivered over the feeder plate 170 and the distributer 172 to the rolls 22 22. Through the stub-pockets 173 and 174 the stock passes into the sifter casement 130 where it passes through a succession of sieves as shown in Fig. 6. The coarse shorts pass through stub-pocket 176ª, spout 178, elevator and feed spout 179 and the finer middlings pass through stub-pocket 177ª, spout 180, elevator and through feed spout 181, to the purifier casement 43. The flour passes through the stub-pocket 182 to the flour conduit 161. These course and finer middlings enter the purifier casement 44 in a manner and go through a process the same as that just described for the purifier 42 and further reduction of the stock is effected accordingly. The coarse middlings pass through the stub-pocket 201ª, spout 207, elevator, and feed spout 208, and the finer middlings pass through stub-pocket 202ª, spout 209, elevator, and feed spout 210 into the purifier casement 44. The flour from the sifter casement 131 passes through stub-pocket 211 into the flour conduit 161.

The coarse middlings from feed spout 208 pass on to the sieve in the purifier casement 44 and the stock taken therefrom is delivered in the manner hereinbefore described to the rolls 26 26. The tailings from this sieve are carried on the runways 212ª down through the stub-pockets 214 and outside the rolls 25 25. The finer middlings from the feed spout 210 pass through the sleeve 212 down between the rolls 25 25 and together the stock that falls from the rolls 26 26 passes into the sifter-casement 132 whence such further process of reduction through a succession of sieves arranged as shown in Fig. 8 is had that the tailings from both ends of the sifter casement are scalped to the center thereof and pass through the stub-pocket 216 into a discharge outlet while the final discharge of flour occurs through the stub-pockets 217 into the flour conduit.

What I claim as my invention, and desire to secure by Letters Patent, is—

1. In a gradual reduction mill, the combination of a first set of rolls, a hopper discharging into same, a second set of rolls, a third set disposed underneath the first set of rolls, and a fourth set disposed underneath the second set of rolls, a sieve disposed underneath the first set of rolls and at an angle to discharge the cracked stock into the second set of rolls, a bottom carried by said sieve and provided with a central longitudinal opening, a sieve underneath the second set of rolls disposed at an angle to discharge the cracked stock into the third set of rolls, a bottom carried by the said sieve provided with longitudinal side openings, and which bottom is of suitable length to discharge its sifted stock short of the third set of rolls, a sieve disposed underneath the third set of rolls and disposed so as to discharge its cracked stock into the fourth set of rolls, a carrier supported by the second sieve to take the sifted stock from the open bottom of the top sieve and to discharge the same beyond the third set of rolls, a shoe disposed underneath the said rolls and sieves, to receive and carry off the stock delivered from the sieves and rolls and from the carrier that discharges beyond the rolls, means to actuate the rolls and sieves, substantially as described.

2. In a gradual reduction mill the combination of a first set of rolls, a hopper discharging into same, a second set of rolls, a third set disposed underneath the first set of rolls, and a fourth set disposed underneath the second set of rolls, a sieve disposed underneath the first set of rolls and at an angle to discharge the cracked stock into the second set of rolls, a bottom carried by said sieve and provided with a central longitudinal opening, a sieve underneath the second set of rolls disposed at an angle to discharge the cracked stock into the third set of rolls, a bottom carried by the said sieve and having longitudinal side openings therein, and which bottom is of suitable length to discharge its sifted stock short of the third set of rolls, a sieve disposed underneath the third set of rolls and disposed so as to discharge its cracked stock into the fourth set of rolls, a carrier supported by the second sieve to take the sifted stock from the open bottom of the top sieve and to discharge the same beyond the third set of rolls, a shoe centrally disposed underneath the said rolls and sieves, having openings at its opposite ends, and having its surface inclined so as to deliver toward its opposite ends the stock received from said sieves and rolls, carrier plates arranged adjacent the ends of said shoe to convey the sifted stock that is discharged beyond the rolls onto the ends of the said shoe, means to actuate the rolls, sieves, and shoes substantially as described.

3. In a gradual reduction mill of the kind described, a first set of rolls, a second set of rolls, a third set disposed underneath the first set of rolls, and a fourth set disposed underneath the second set of rolls, a frame, a housing supported by said frame, sieves and a shoe loosely supported in said housing and arranged in combination with the said rolls as and for the purposes substantially as described, a driving shaft, a secondary shaft, connections between the driving shaft and the secondary shaft whereby the latter is reciprocated, a member carried by the secondary shaft, power transmitting connections between the said member and the sieves, and between the said member and the shoe.

4. In a gradual reduction mill, the combination of a first set of rolls, a hopper discharging into same, a second set of rolls, a third set disposed underneath the first set of rolls, a fourth set disposed underneath the second set of rolls, a sieve disposed underneath the first set of rolls and inclined upwardly and which will discharge its cracked stock into the second set of rolls, a bottom carried by the said sieve and provided with a central longitudinal opening, a sieve underneath the second set of rolls and inclined downwardly and which will discharge its cracked stock into the third set of rolls, a bottom carried by the said sieve and provided with longitudinal side openings and which bottom is of suitable length to discharge its sifted stock short of the third set of rolls, a sieve disposed underneath the third set of rolls and inclined upwardly and which will discharge its cracked stock into the fourth set of rolls, a carrier supported by the second sieve to take the sifted stock from the open bottom of the top sieve and to discharge it beyond the third set of rolls, a shoe disposed underneath the said rolls and sieves, to receive and carry off the stock delivered from the sieves and rolls and from the carrier that discharges beyond the rolls, a frame, a housing supported by said frame and in which housing the said sieves and shoe are loosely supported, a driving shaft underneath the shoe, a secondary shaft underneath the top sieve, said shafts being journaled on the said frame, a face-wheel carried by the secondary shaft, connections between the face-wheel and each of the sieves and with the shoe, a crank carried by the driving shaft, an arm carried by the secondary shaft, a connecting rod between the said crank and the said arm and capable of being adjusted to varied positions on the latter, substantially as described.

5. In a gradual reduction mill, a set of rolls, pillow blocks to carry the journal of each end of the movable roll, the base of each of said pillow blocks having a transverse bore, a pin disposed in each of said bores and its ends supported in the sides of the frame member, the ends of said pin being eccentric to the body portion, means to secure the pin at different adjusted positions, a threaded upright secured at a point adjacent to each of said pillow blocks, an arm from each pillow block to loosely engage the said threaded uprights said arm being capable of division, a spring carried by each upright to press the arms upwardly, a hand wheel on each of said uprights to bear against the tops of said arms.

6. In a gradual reduction mill, a set of rolls, pillow blocks to carry the journal of each end of the movable roll, the base of each of said pillow blocks having a transverse bore, a pin disposed in each of said bores its ends being supported in the sides of the frame member, the end portions of said pin being eccentric to the body portion, means to secure the pin at different adjusted positions, an upright disposed loosely in the frame and adjacent to each of said pillow blocks and being threaded on its upper end and provided with a hand wheel, an arm extending from the pillow block to loosely engage said upright, said arm consisting of two members detachably secured together, a spring between the said frame and the arm to press the latter upwardly, a head on the bottom of each upright, means to simultaneously draw down and hold said arms in drawn position, including a divided member supported by the frame, each part of which divided member is fulcrumed and engages the bottom head of said upright, a cam disposed at the meeting ends of said divided member.

7. In a gradual reduction mill, a set of rolls, a divided member supported by the frame, each part of which divided member is fulcrumed on the same frame, connections between the ends of said divided member and the pillow blocks supporting the movable roll, a cam disposed underneath the meeting ends of said divided member.

8. In a gradual reduction mill, a set of rolls, a divided member supported by the frame, each part of which divided member is fulcrumed on the said frame and the meeting ends of said divided member being angular in form, connections between the outer ends of said divided member and the pillow blocks that support the ends of the movable roll, means to raise and lower and to hold the meeting ends of said divided member in different raised and lowered positions, including a cam supported by the frame and having angular faces to engage the meeting ends of said divided member, means between the frame and the pillow blocks to press the movable roll toward the fixed roll.

In testimony whereof I have signed my name to this specification in the presence of two subscribing witnesses.

WILLIAM M. PAGE.

Witnesses:
   THOMAS L. RYAN,
   JNO. W. RYAN.